1,759,934

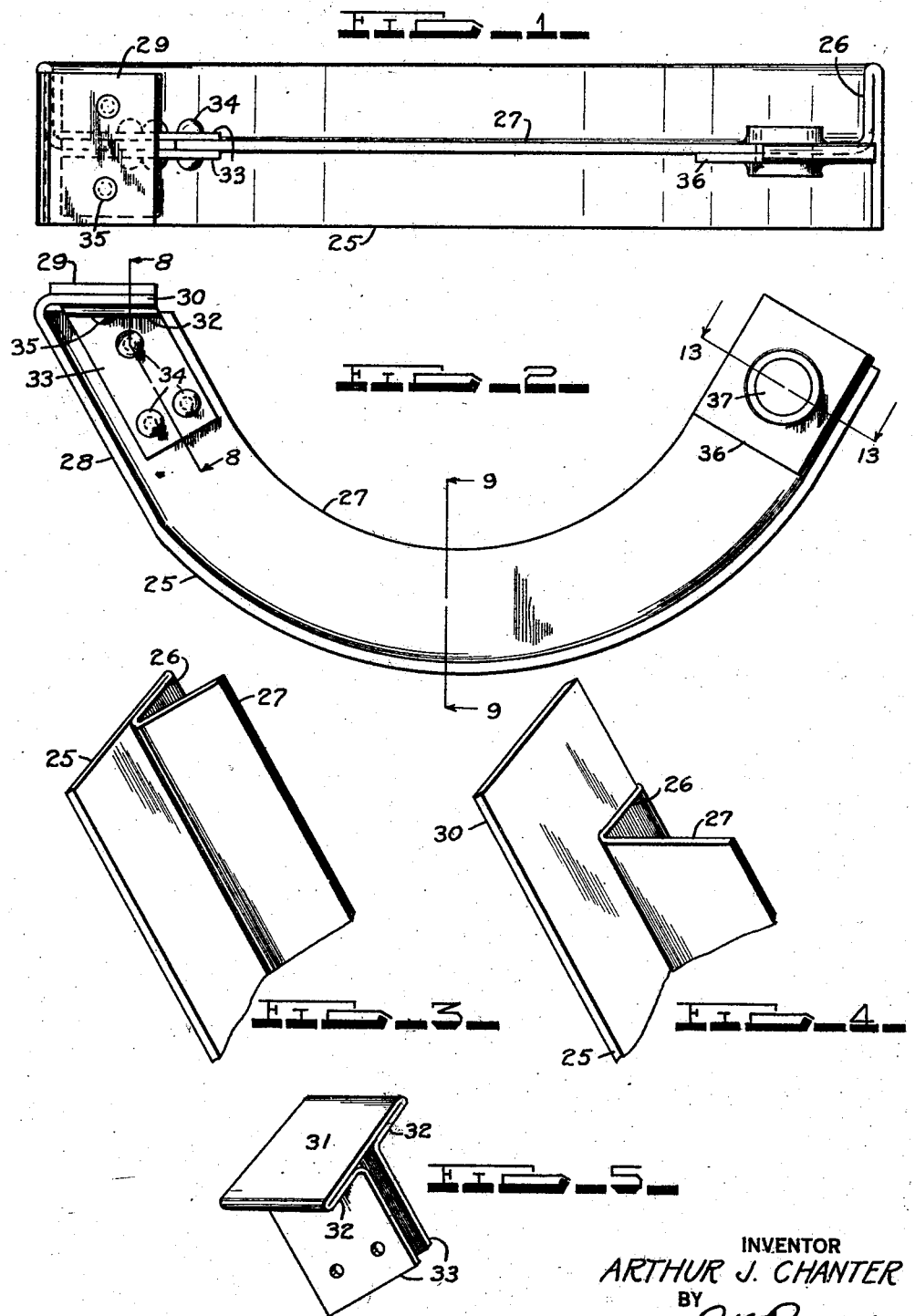
May 27, 1930.  A. J. CHANTER  1,759,934
BRAKE
Filed Feb. 27, 1926   3 Sheets-Sheet 1
INVENTOR
ARTHUR J. CHANTER
BY
ATTORNEY May 27, 1930.   A. J. CHANTER   1,759,934
BRAKE
Filed Feb. 27, 1926   3 Sheets-Sheet 2
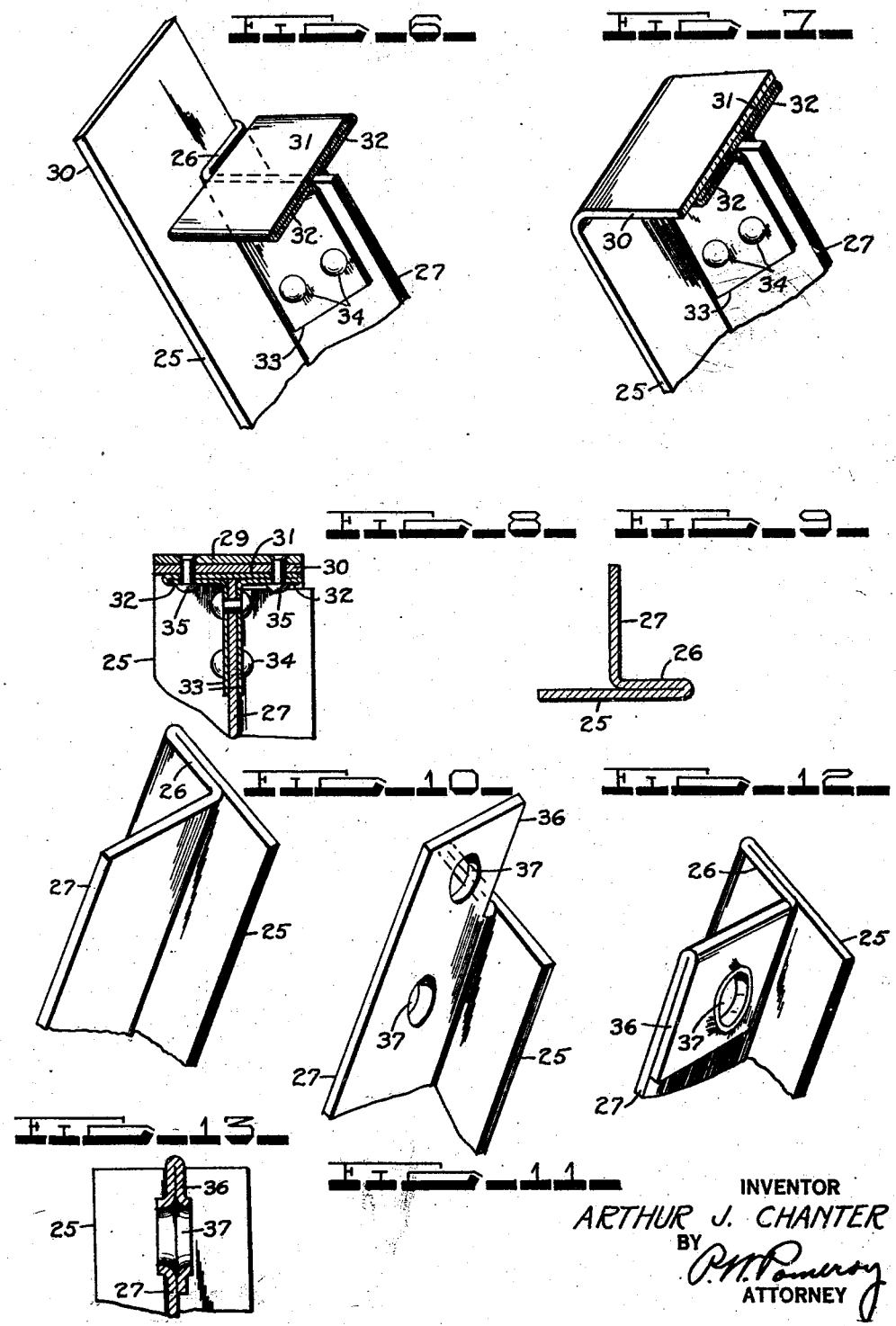
INVENTOR
ARTHUR J. CHANTER
BY
ATTORNEY May 27, 1930.  A. J. CHANTER  1,759,934
BRAKE
Filed Feb. 27, 1926  3 Sheets-Sheet 3
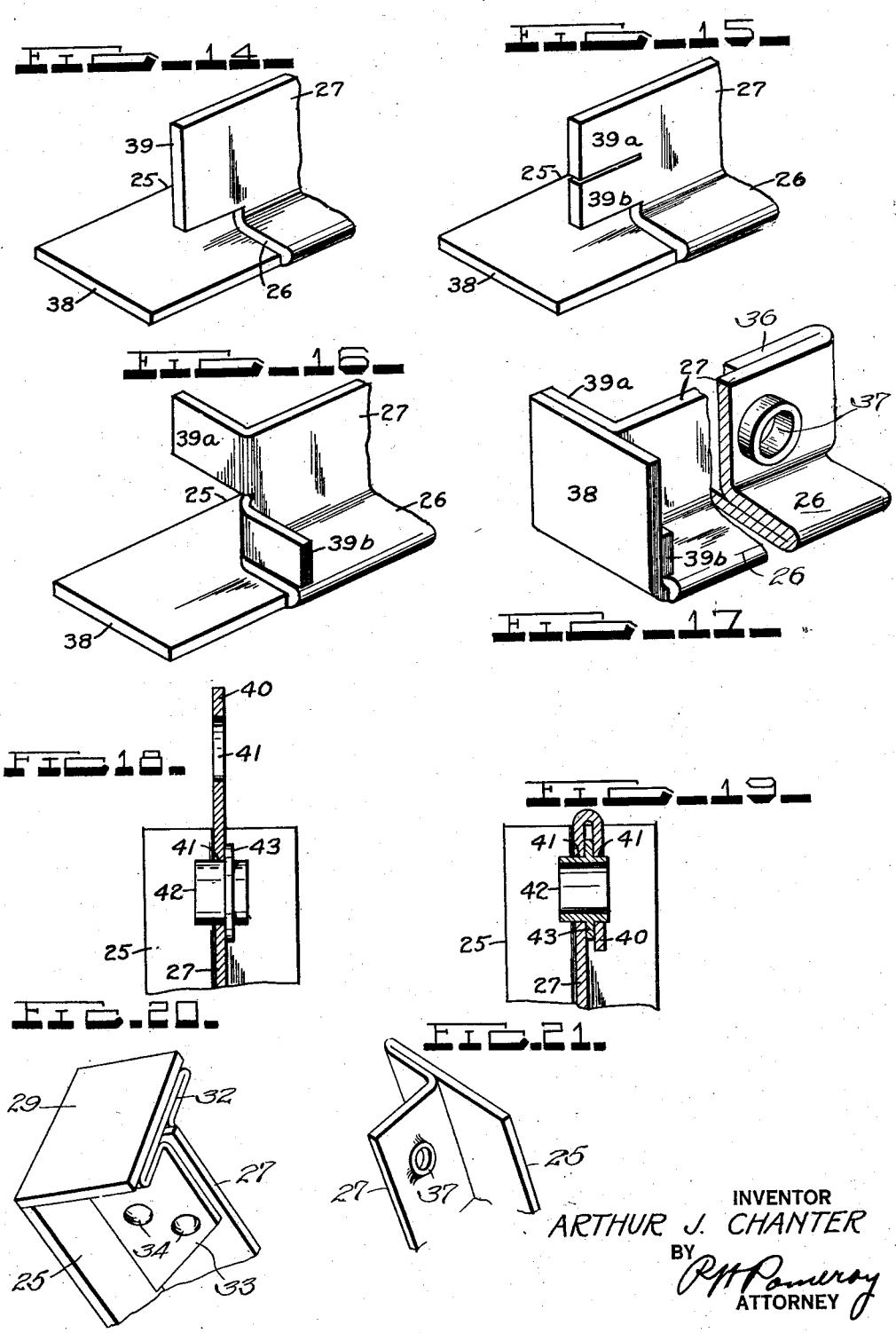
INVENTOR
ARTHUR J. CHANTER
BY
ATTORNEY Patented May 27, 1930

UNITED STATES PATENT OFFICE

ARTHUR J. CHANTER, OF SOUTH BEND, INDIANA, ASSIGNOR TO THE STUDEBAKER CORPORATION, OF SOUTH BEND, INDIANA, A CORPORATION OF NEW JERSEY

BRAKE

Application filed February 27, 1926. Serial No. 91,115.

This invention relates to shoes for brakes, and particularly to shoes for brakes of the internal expanding type such as are commonly used in connection with motor vehicles, and the principal object is to provide such a shoe formed from sheet metal whereby it will be light in weight, strong in construction, and will be capable of being economically produced, particularly in quantities.

Another object is to provide a pressed metal brake shoe formed, for the most part from a single piece of sheet metal to present a cylindrical brake lining supporting portion and a radial rib or flange portion.

Another object is to provide a pressed metal brake shoe as described in which the metal extends transversely across the brake lining supporting face or portion and is then reversely bent back on itself at or adjacent to its center line at which point the metal is bent radially inwardly to form a radial rib.

Another object is to provide new and novel means for supporting the anchored end of such shoes.

A further object is to provide new and novel means for supporting a hardened cam contact member on the free end of such shoes.

The above being among the objects of the present invention, the same consists of certain features of construction and combinations of parts to be hereinafter described with reference to the accompanying drawings, and then claimed, having the above and other objects in view.

In the accompanying drawings which illustrate a suitable embodiment of the present invention, and in which like numerals refer to like parts throughout the several different views, Figure 1 is a plan view of a brake shoe embodying the present invention.

Figure 2 is a side view of the brake shoe shown in Figure 1.

Figure 3 is a perspective view of the free end of the brake shoe before the operation of forming the same to receive the hardened cam contact face member has been begun.

Figure 4 is a perspective view of the free end of the brake shoe after the first step in the operation of forming the same to receive the hardened cam contact face member.

Figure 5 is a perspective view of the cam contact face support reinforcement.

Figure 6 is a perspective view showing the manner in which the cam contact face support reinforcement is secured to the free end of the shoe.

Figure 7 is a perspective view showing the extended end of the shoe bent up over the reinforcing member, thus placing the shoe in condition to receive the hardened cam contact face member.

Figure 8 is a sectional view taken on the line 8—8 of Figure 2.

Figure 9 is a sectional view taken on the line 9—9 of Figure 2.

Figure 10 is a perspective view of the anchored end of the shoe before any operation has been begun on the same to form it to receive its anchoring pin.

Figure 11 is a perspective view of the end of the shoe shown in Figure 10 after the first operation has been performed on the same to prepare it for receiving its anchoring pin.

Figure 12 is a perspective view of the anchored end of the shoe after it has been prepared to receive an anchoring pin.

Figure 13 is a section through the anchored end of the shoe taken on the line 13—13 of Figure 2.

Figure 14 is a perspective view of the free end of the shoe as formed in the first step of providing a modified form of cam contact face member support.

Figure 15 is a perspective view of the end of the shoe shown in Figure 14 after the next operation has been performed thereon to form the members to receive the cam contact face member.

Figure 16 is a perspective view illustrating the next step in preparing the free end of the shoes to provide the modified cam contact member support, after that shown in Figure 15.

Figure 17 shows the final form of modified cam contact face member support.

Figure 18 shows a modified form of anchored end construction in the process of formation.

Figure 19 shows the modified form of anchored end construction fully completed.

Figure 20 shows a modified form of the brake shoe in which the cam contact member is secured directly to the T-shaped reinforcing member.

Figure 21 is a modification of the anchored end of the brake shoe shown in Figure 12.

The brake shoe illustrated in the accompanying drawings is of that conventional type which is adapted to be anchored on a pivot pin at one end and engaged by an expanding cam at the other or free end, and provided with a cylindrical brake lining attaching surface and radial strengthening or stiffening means. Accordingly the present brake shoe is provided with a cylindrical brake lining attaching surface portion 25, the metal along one edge thereof being bent back on itself as at 26, preferably in contact with the back face of the portion 25, to the center line of portion 25, and is then bent radially inwardly to form the radial rib or flange 27 which provides the principal strengthening or stiffening means therefor, although it will be evident that the reversely bent portion 26 also imparts added strength to the structure.

The forming of the metal to this shape may be accomplished by either of two ways, first, the metal may be formed to the section shown in Figure 9 in a straight strip, and then bent to the proper cylindrical shape, or, second, the metal may be formed cylindrically in the first place with the reversely bent portion 26 and face portion 25 first suitably separated, and by successive forming steps be brought together as shown. The first method will be found most satisfactory where the radial rib 27 is not of very great depth, and the second method will be found most satisfactory where the depth of the radial rib 27 is found to be of too great a depth to be properly or easily drawn.

It may be found desirable to bring either one or both ends of the shoe inwardly, as illustrated at 28 in Figure 2, out of the path of the normally cylindrical face of the lining attaching portion 25 in order to eliminate any possibility of the rivets (not shown) which secure the ends of the brake lining (not shown) to the face 25 from possible contact with the drum, and to take the brake lining out of contact with the drum (not shown) at the point where localized pressure may occur with consequent ill effects.

In Figures 3 to 7 inclusive is shown a preferable manner of forming the free end of the shoe to receive the hardened cam contact face member 29 which takes the wear of the conventional expanding cam (not shown). The end of the shoe as first formed is illustrated in Figure 3. A portion of the end of the reversely bent portion 26 and radial rib 27, of a length approximately equal to the depth of the rib 27 is removed from this end as illustrated in Figure 4, leaving a projecting portion 30 of the face portion 25. A T-shaped reinforcing member formed from sheet metal to provide a head or face portion 31, reversely bent edges 32, and perpendicular spaced parallel arms 33 as illustrated in Figure 5 is then secured to the radial rib 27 by rivets such as 34, the face portion 31 being positioned perpendicularly to the face 25, and the rib 27 being received between the arms 33 as shown in Figure 6. The extending end 30 of the face 25 is then bent up perpendicularly to the face 25 into contact with the face 31 of the reinforcing member, as shown in Figure 7, in which position it is preferably secured to the face 31 by welding, riveting, or the like. The cam contact face member 29 is then secured to the support thus formed by rivets, such as 35 shown in Figure 8, or by other suitable means. The support thus formed is very rigid and capable of withstanding hard use.

If desired, the brake shoe can be originally formed with the face portion 25 having an end 30 extending therefrom and beyond the end of the reversely bent portion 26 and the rib 27, as shown in Figure 4. If the brake shoe is formed after this manner, it will not be necessary to cut away portions of the reversely bent portion 26 and the rib 27 as previously described, but the end portion 30 can be bent at right angles to the face portion 25 in identically the same manner as shown in Figure 7. Also, if it is desired, the reinforcing member can be omitted and the end portion 30 of the brake shoe can be bent at substantially right angles to the face portion 25 into contact with the reversely bent portion 26 and the radial rib 27, the portion 30 being spot welded or otherwise secured to the radial rib. It may also be found desirable to omit the end portion 30 and secure the cam contact 29 directly to a cam reinforcing member 32 as shown in Figure 20.

A preferable method of forming the anchored end of the shoe to receive its pivot pin is illustrated in Figures 10 to 13 inclusive. The end of the shoe, as shown in Figure 10, is first prepared by removing a portion of the face 25 and reversely bent portion 26, as illustrated in Figure 11, leaving an extending end 36 on the rib 27. Holes 37 are then punched in the rib 27, one in the extended end 36 and one farther back in the rib 27, the metal surrounding the same being drawn outwardly to form a collar in the operation of punching. The extending end 36 is then bent back on the rib 27 in such a manner as to bring the holes 37 into alignment and is preferably welded to the rib 27 in such position. This results, as illustrated in Figure 13, in an opening having a substantial length of bearing surface for the pin upon which it is to be pivotally anchored, although a bushing (not shown) may be pressed into the same to provide a larger bearing surface if desired.

If desired, the brake shoe can be originally formed to the shape shown in Figure 11 making it unnecessary to remove a portion of the radial flange 27 and the reversely bent portion 26 prior to the bending of the end portion 36 to align the openings 37. In some forms of brake shoes where a heavy metal stock is used, it may be found that it is not necessary to provide an anchoring end for the pivot pin which is reinforced as shown in Figures 12 and 13 and in such a construction as shown in Figure 21 an opening 37 formed with a flange extending there-around can be provided in the radial rib 27 and the end portion 36 having a second hole 37 therein can be omitted. Also, it may be desirable to use a bushing in the hole 37, in which case the flange surrounding the hole can also be omitted, and a construction like that shown in Figure 18 can be substituted.

A modified form of cam contact face member support is shown in Figures 14 to 17 inclusive. In this form the end of the shoe is first prepared as shown in Figure 14 by removing a short piece of the radial rib 27 and a longer piece of the reversely bent portion 26, leaving an extending end 38 on the face portion 25 and an extending end 39 on the radial rib 27. The extending end 39 is then slotted back to a point in line with the end of the reversely bent portion 26, as illustrated in Figure 15, thus dividing the end 39 into two pieces 39$^a$ and 39$^b$. The pieces 39$^a$ and 39$^b$ are then bent perpendicularly to the plane of the rib 27, in a direction opposite to each other, as illustrated in Figure 16, and the extending end 38 of the face portion 25 is then bent up into contact with them and is secured in such position, as illustrated in Figure 17, and the hardened cam contact face member 29 may then be applied in the same manner as previously described.

A modified manner of forming the anchored end is shown in Figures 18 and 19. In this form the end of the shoe is first formed in exactly the same manner as in the previous form shown in Figure 11, with the exception that the metal around the openings need not be drawn out to form collars. In the present form an extended end 40 and openings 41, corresponding to the end 36 and openings 37 of Figure 11, are provided. A bushing 42 having a peripheral flange 43 is then inserted in the lower opening 41 and the end 40 is bent back on itself in such a manner that the remaining opening 41 engages the bushing 42 as shown in Figure 19, thus securing the bushing 42 in position.

Formal changes may be made in the specific embodiment of the invention described without departing from the spirit and substance of the broad invention, the scope of which is commensurate with the appended claims.

What I claim is:—

1. A brake shoe formed from a single sheet of metal into a cylindrical brake lining attaching surface, said shoe having a single reversely bent stiffening portion and a single inwardly extending radial rib.

2. A brake shoe formed from sheet metal comprising a lining attaching surface having the metal of only one edge thereof bent back on itself to a point intermediate the edges and then bent perpendicular to said surface to provide a stiffening rib.

3. A pressed metal brake shoe having a cylindrical lining attaching surface and a centrally disposed radial rib, means on an end of said rib providing oppositely disposed transverse flanges, and an extended end on said attaching surface bent up perpendicularly to said attaching surface and secured to said flanges.

4. A pressed metal brake shoe having a cylindrical lining attaching surface and a radial rib, said rib having an extended end bent back into contact with said rib, and aligned openings in said rib and extended end.

5. A pressed metal brake shoe having a cylindrical lining attaching surface and a radial rib, said rib being provided with an extended end, a collared opening in said rib, and a collared opening in said extended end, said extended end being bent back on said rib with said openings in alignment.

6. A brake shoe formed from sheet metal to provide a face portion and a radial rib, an extended end on said face at one end of said shoe, transversely extending flanges on said rib adjacent said end against which said rib is bent and secured, an extended end on said rib at the other end of said shoe bent back on itself into parallelism with said rib, and aligned openings in the last mentioned extended end and in said rib.

7. A pressed metal brake shoe formed from a single piece of metal comprising a lining supporting face, a single rib perpendicular thereto, and a reinforcing part connecting said rib and one side of said face, a portion only of said supporting face being reinforced by said part.

8. A brake shoe formed from a single sheet of metal to provide a cylindrical brake lining attaching portion, a single reversely bent stiffening portion, and an inwardly extending radial rib, and end of said rib being secured to said lining attaching portion.

9. A brake shoe formed from a single sheet of metal to provide a cylindrical brake lining attaching portion, a reversely bent stiffening portion, and an inwardly extending radial rib, an end of said cylindrical portion being bent and secured to an end of said rib.

10. A brake shoe formed from sheet metal comprising a brake lining attaching portion, one edge thereof being reversely bent to present a double thickness of metal to its center line, a radial rib extending inwardly from said reversely bent portion, and means for securing an end of said rib to an end of said brake lining attaching portion.

11. A brake shoe formed from sheet metal comprising a brake lining attaching portion, one edge thereof being reversely bent to present a double thickness of metal to a point intermediate the edges of said attaching portion, a radial rib extending inwardly from said reversely bent portion, and means offset from the plane of said rib contacting with said lining attaching portion.

12. A brake shoe formed from sheet metal comprising a brake lining attaching portion, one edge thereof being reversely bent to present a double thickness of metal to a point intermediate the edges of said attaching portion, and a radial rib extending inwardly from said reversely bent portion, said lining attaching portion having an end bent out of the plane of the brake lining surface thereof into contact with an end of said rib.

13. A brake shoe formed from a sheet of metal comprising a lining supporting part having one edge thereof bent back on itself, a single rib formed perpendicular to said lining supporting part, and means at the end of said rib to unite the same with the corresponding end of said lining supporting part.

14. A brake shoe formed from sheet metal comprising a lining attaching portion having the metal at one edge thereof bent back on itself to a point intermediate the edges and then bent perpendicular to said surface to provide a rib, said lining attaching portion and said rib portion having projecting parts formed to contact with each other to unite the ends of said portions.

15. A pressed metal brake shoe comprising a lining supporting face, a single rib perpendicular thereto, means for securing and end of said rib to the corresponding end of said lining supporting face, and means adjacent the opposite end of said rib providing a support for a pivot.

16. A pressed metal brake shoe having a generally arcuate lining supporting band, and an L-shaped reinforcement therefor, one leg of said reinforcement being concentrically engaged with said band and the other leg being extended radially thereof.

17. A pressed metal brake shoe having a generally arcuate lining supporting band, and an L-shaped reinforcement therefor having one leg thereof integrally connected with said band and positioned concentrically thereof, and having its other leg extending radially of said band intermediate its edges.

18. A brake shoe comprising a pressed metal part including a cylindrical flange forming at least part of the friction face and terminating at one edge of said flange and at the other edge integrally continued to form a stiffening web arranged between the edges of the shoe, said other edge forming one side edge of the friction face of the shoe.

19. A brake shoe comprising a pressed metal part including a cylindrical flange forming at least part of the friction face and terminating at one edge of said flange and at the other edge integrally continued to form a stiffening web arranged between the edges of the shoe, said other edge forming one side edge of the friction face of the shoe, together with a bracing portion connecting the flange and web.

20. A brake shoe including a pressed metal part having a cylindrical flange forming the entire friction face of the shoe and terminating at one side edge of the shoe, said part integrally continued at the other side edge of the shoe toward the central plane of the shoe and then projected inwardly to form a stiffening web between the edges of the shoe.

Signed by me at South Bend, Indiana, U. S. A., this 24th day of February, 1926.

ARTHUR J. CHANTER.